United States Patent
McCrary

(10) Patent No.: US 6,206,261 B1
(45) Date of Patent: Mar. 27, 2001

(54) SCABBARD FOR LONG GUNS

(76) Inventor: C. Randal McCrary, Rte.1, Box 25, Estill, SC (US) 29918

( * ) Notice: Subject to any disclaimer, the term of this patent is extended or adjusted under 35 U.S.C. 154(b) by 0 days.

(21) Appl. No.: 09/442,088

(22) Filed: Oct. 21, 1999

(51) Int. Cl.⁷ .............................. B60R 7/14; B60R 9/055; B65D 85/00
(52) U.S. Cl. ................ 224/562; 42/96; 206/315.11; 224/315; 224/324; 224/404; 224/913
(58) Field of Search .................... 224/562, 404, 224/311, 315, 321, 324, 553, 913; 206/315.11; 42/96

(56) References Cited

U.S. PATENT DOCUMENTS

| | | | |
|---|---|---|---|
| 2,588,467 | * | 3/1952 | Barney ................. 224/913 |
| 2,706,036 | * | 4/1955 | Neal .................. 206/315.11 |
| 2,781,897 | * | 2/1957 | Dale .................. 206/315.11 |
| 3,266,633 | * | 8/1966 | Graebner ................. 211/60 |
| 3,700,147 | * | 10/1972 | Vaughn ................. 224/913 |
| 4,108,313 | | 8/1978 | Bogar, Jr. . |
| 4,197,951 | | 4/1980 | Shassere . |
| 4,433,500 | | 2/1984 | Kunevicius . |
| 4,446,900 | * | 5/1984 | Markovich ............. 206/315.11 |
| 4,877,131 | * | 10/1989 | Patros et al. ............. 224/913 |
| 4,922,642 | | 5/1990 | Ohlhauser . |
| 5,110,022 | * | 5/1992 | Dvoroznak et al. ............. 224/150 |
| 5,116,010 | | 5/1992 | McMasters et al. . |
| 5,299,722 | * | 4/1994 | Cheney ................. 224/273 |
| 5,310,103 | * | 5/1994 | Weber et al. ............. 224/311 |
| 5,595,333 | | 1/1997 | Boston . |
| 5,642,818 | * | 7/1997 | Brent et al. ............. 211/70.5 |
| 5,683,021 | * | 11/1997 | Setina ................. 224/311 |
| 5,706,990 | | 1/1998 | Lahrson . |
| 5,878,929 | | 3/1999 | Leonard . |
| 6,145,719 | * | 11/2000 | Robert ................. 224/401 |

* cited by examiner

Primary Examiner—Stephen P. Garbe
(74) Attorney, Agent, or Firm—Harleston Law Firm; Kathleen M. Harleston

(57) ABSTRACT

A scabbard for mounting a long gun, includes: a one-piece, rigid cover having an enclosed bottom end, an open top end, and two generally parallel sides separated by a back; a padded, protective lining attached to the rigid cover; an attachment mechanism for removably attaching the scabbard; a detachable strap attached to a top open end of the device for closely holding the gun barrel, and a barrier across an open front of the scabbard for holding in the gun butt. The scabbard preferably has a padlock for locking down the gun barrel. The scabbard may have a locking hinged lid mechanism instead of a strap and barrier. The scabbard can be mounted vertically, horizontally or diagonally, preferably in or on a vehicle. A method for making the scabbard is also included.

20 Claims, 5 Drawing Sheets

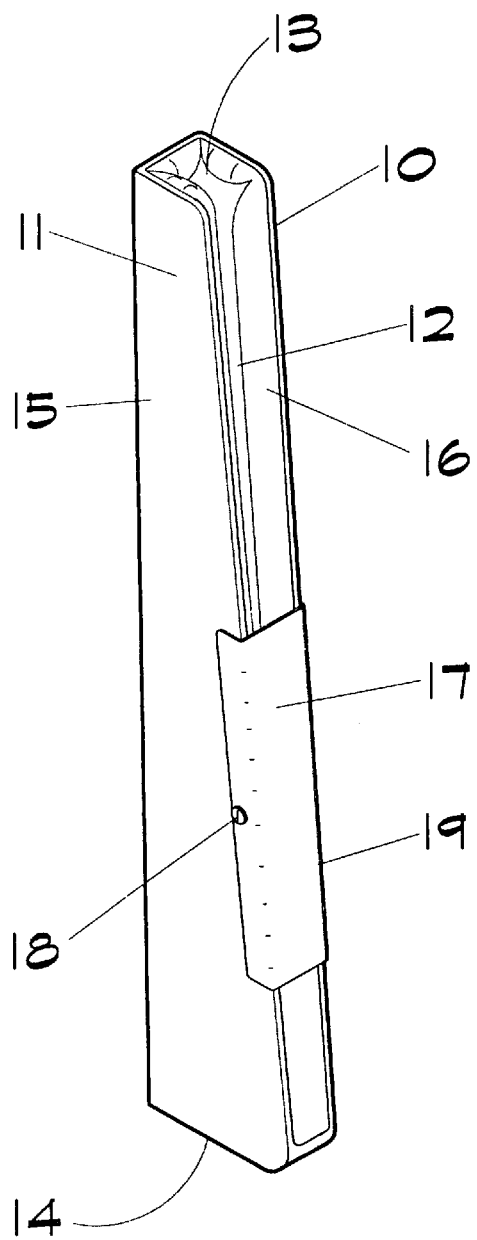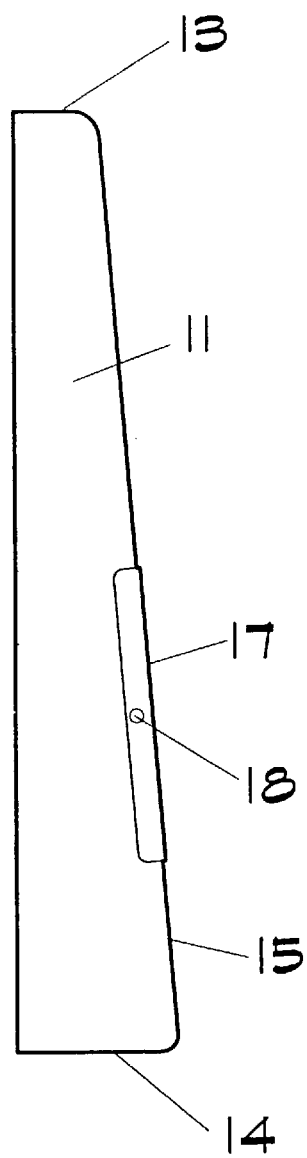
FIG. 1
FIG. 2

SCABBARD FOR LONG GUNS

BACKGROUND OF THE INVENTION

1. Technical Field

The present device is a device for mounting and protecting a long gun, more particularly a mountable, hard-shell gun scabbard with a safety lock.

2. Background Information

With the rash of recent abuses of guns, it has become of paramount importance for legitimate gun owners to have a secure mount for their gun when it is being transported to hunting sites, gun shows, target practice, etc. Various gun racks and other gun mounting devices, gun gloves, gun boots, and gun cabinets, cases and cages are known. Some of these devices are said to be capable of being mounted inside a vehicle in, for example, the passenger compartment, or overhead on the inside roof of the vehicle. In particular, various racks have been invented for carrying long guns on all-terrain vehicles (ATVs).

Presently available gun mounting racks and cases do not fulfill a present need for a lightweight, easy-to-mount, secure gun mount for carrying a gun, which protects the gun and on-lookers, yet allows the owner to quickly mount and then remove the gun. Given the high cost of many shotguns, a gun case suitable for protecting the owner's investment is needed. The device of the present invention combines the advantages of: a soft gun glove or carrying case by protecting the gun finish from marring; a gun boot by allowing easy access to the gun and mounting on or in a vehicle; and a hard-cover carrying case by protecting the gun from impact. The gun scabbard of the present invention is lightweight, versatile, and easily mounted in or on a vehicle. This device can, if desired, be easily detached from the vehicle and reattached to a wall or brackets in a garage or closet, for example, for storage.

The device of the present invention provides both soft and hard cover-type protection in one unit. Here, the scabbard is itself the mounting device; there is no need for enclosing the gun first in a soft scabbard, and then in a mounting device. The soft interior of this scabbard protects the gun's finish from mars and absorbs shock, and its aluminum shell helps to protect the gun inside from hard bumps and accidental discharges. When the gun is mounted in the scabbard, the trigger is placed against the enclosed back side of the scabbard to conceal and protect it. Of course, all guns should be unloaded prior to mounting, but human error unfortunately must be guarded against. Although a long gun mounted in the present device is easy for the owner to access, it can be locked into the device to help prevent access by others. The scabbard of the present invention can be mounted in a vertical position (preferred), e.g., behind the passenger seat, or in a horizontal or diagonal position, e.g. on an all-terrain vehicle.

BRIEF SUMMARY OF THE INVENTION

The present invention is a device for mounting a long gun, preferably in or on a vehicle. The device comprises:

a one-piece, rigid cover member, formed into a rectangular-shaped box suitable for holding a long gun, the box comprising an enclosed bottom end, an open top end, and two generally parallel sides separated by a back, the back being generally perpendicular to the sides;

a padded, protective lining attached to an inside of the rigid cover member;

an attachment mechanism for attaching the device to a surface; and a detachable strap attached to a top open end of the device, the strap being adapted for closely holding a gun barrel, and a barrier across an open front of the device, the barrier being adapted for holding a gun butt in the device; or a locking lid mechanism, adapted for preventing removal of a long gun from the device without a key to the locking lid mechanism.

Also included herein is a method for making a protective scabbard for long guns, the method comprising the steps of:

cutting, bending, or forming a generally rectangular section of rigid cover material to form a rectangular-shaped scabbard with an open front and an open top end, the scabbard having elongate sides and back, and a closed bottom end opposite the open top end, the scabbard being adapted to support a long gun;

removably attaching to an inside portion of the scabbard a water-resistant, protective, padded liner;

attaching a locking mechanism on the outside of the scabbard; and fixing to the scabbard an attachment mechanism adapted for detachably attaching the scabbard to a surface.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein:

FIG. 1 shows a perspective view of a gun scabbard according to the present invention, with a locking lid;

FIG. 2 is an elevation view of one side of a scabbard according to FIG. 1;

DETAILED DESCRIPTION OF THE INVENTION

Figure 3:
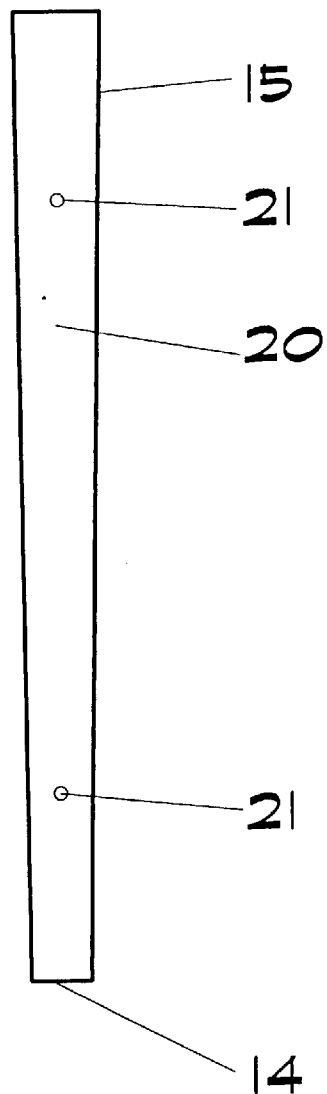
FIG. 3 is an elevation view of the back of a scabbard according to FIG. 1.

In the following description, like reference characters designate like or corresponding parts throughout the several views. Also, in the following description, it is to be understood that such terms as "front," "back," "inside," "outside," and the like are words of convenience and are not to be construed as limiting terms. Referring in more detail to the drawings, the invention will now be described.

Referring to FIG. 1, a scabbard 10 according to the present invention has a generally rectangular shape, with two planar sides 11 joined by a planar back, an open front 12, and an open top end 13. Opposite the open end 13 is a relatively narrow, closed bottom, planar end 14. When a long gun is mounted in the device, the bottom end 14 supports the butt of the gun. By "long gun" is meant rifles, shotguns, and other guns with elongate barrels. The bottom end 14 is wider than the open end 13, and the edges of the open front 12 gradually slope from a wider bottom to a narrower top. This follows the general shape of a long gun, and allows a long gun mounted in the device to lean slightly into the scabbard. This construction allows the gun user to easily grasp the gun grip, and quickly remove the gun from the scabbard. The scabbard is preferably mounted in a vehicle. Of course, a gun held in the scabbard can be removed without detaching the scabbard from the vehicle. The sides 11 of the device 10 are at approximately right angles to its bottom end 14, and the sides are at approximately right angles to the back of the device.

The scabbard is made of a rigid cover member (a hard shell) 15 and a soft inner liner 16. The cover member 15 is preferably made of metal, or hard plastic, especially Fiberglas. It is most preferably aluminum. It can be covered on the outside with a decorative layer, or simply painted. The cover member can be colored to match or complement the gun or the vehicle, or painted in a green camouflage pattern to reduce visibility in the field, or painted a fluorescent color for clear visibility in the field. The preferred aluminum cover is unique in that it begins as a thin, generally rectangular-shaped, single piece of aluminum that is bent to form a generally rectangular-shaped box with an open front 12 and one open end 13. The aluminum piece is most preferably less than about 0.2 inches in thickness so that it protects the gun, yet is lightweight. The piece of aluminum is preferably bent in several places, most preferably four (4) places, along its edges to form a box-shape. Bending the aluminum piece has been found to be quicker, more durable, and safer than cutting and welding sections of material together to form a scabbard cover. Welding, which can be dangerous and time-consuming, is not necessary to form this scabbard cover member. Even though it is lightweight, this hard cover member protects the gun inside from hard bumps and vibration as the vehicle traverses rough terrain. It also reduces the possibility of an accidental discharge if the gun is jarred. The preferred aluminum cover member is durable, and is resistant to rusting, scratching, scuffing and fading.

As shown in FIG. 1, attached to the inside of the hard cover 15 is a protective padded liner 16 made of a relatively soft, durable, weather-resistant, quick-drying material. The liner 16 is preferably fabric and padding, but could be injected foam rubber laminated to the inside of the hard shell. The liner is preferably detachably attached to the hard cover by hook and loop strips. The liner is most preferably designed to slide quickly onto the scabbard, with flaps holding hook and loop strips at the bottom of the scabbard. The liner can thus be removed for cleaning, drying, or replacement. The liner lightly holds the gun in the scabbard, protects the finish of the gun from scratching, and protects against the slight shocks that can throw off scope alignment.

In the preferred embodiment shown in FIG. 1, a hinged lid mechanism 17 locks down over the open front 12 midsection of the device 10. The locking mechanism 18 on the lid is preferably opened by the owner using a key, although a combination lock or other suitable type of lock could be employed instead of a key.

Referring to FIG. 2, a side 11 of the gun scabbard is wider at the bottom (see 14) than at the top (see 13). The device 10 is preferably about twice as wide at the bottom end as it is at the top end of the device. The bottom end of the device is wider to accommodate the butt of a long gun. The lid mechanism 17 preferably includes a hinge 19 along its length, as shown in FIG. 1. The locking lid mechanism 17 offers protection from the prying hands of any curious children or adults. It extends across the mid-section of the open front of the scabbard, where the gun action, including the safety catch and trigger are located. The lid is sized so as to cover this trigger area because the portion of the gun that poses the most danger is the trigger. There is, though, no need to cover the entire gun with the scabbard. The present scabbard is novel in that it need not extend the full length of a long gun. This allows its use for a wide variety of styles of long guns. Heretofore, different covers had to be used for different styles of gun. For example, one rifle has a stock which extends approximately two-thirds of the total length of the gun, while an over-and-under shotgun has a shorter stock. Both would fit in this scabbard, as well as other long gun styles.

Of course, guns must always be unloaded prior to mounting, regardless of the type of mounting device. The safety catch should be kept on. When the gun is loaded, the safety should be on until the user is ready to shoot, e.g., until game is flushed. Field etiquette must be observed, and guns must be used safely and appropriately.

The main reason that the gun is easy to access is that it is not fully enclosed by the scabbard. The front of the scabbard is relatively open, and the barrel protrudes from the end of the scabbard. Once the lid is unlocked and opened, the user can insert his or her hand into the scabbard, grasp the gun grip, and pull the gun up in a single arm motion. It is believed that it is not necessary to cover the entire gun to ensure safety; here, the lid locks down over the entire trigger area rendering it difficult for even a child's small fingers to access the concealed trigger. The scabbard is designed so that a gun mounted in the scabbard cannot be pulled out from the top end 13 of the scabbard. This is because the scabbard 10 is narrower at the top than at the bottom, and the gun stock will not fit through the opening between the closed lid and the back of the device. Although this scabbard may briefly deter a bumbling burglar, it is not intended to protect absolutely from theft as most thieves can open locked gun storage devices.

The slender profile of the present device allows easy storage in tight spots. Its shape conforms to the shape of a long gun. It has been found that it is not necessary to occupy additional space with a great deal of cushioning, as is done in many commercially available gun carrying cases. The present device can be mounted vertically, for example, behind the passenger seat in a car or truck, or horizontally, for example, on the front of an all-terrain vehicle. One, two or three scabbards could be mounted on an ATV or other type of vehicle. The gun owner's hands are free to operate the vehicle.

Referring to FIG. 3, the back 20 of the device holds a mechanism for attachment of the device 10, preferably in or on a vehicle. In the embodiment shown in FIG. 3, two, spaced-apart holes 21 are shown for attaching the device with bolts or brackets to a surface. The outside hard cover member 15 of the back is shown. The back 20 of the scabbard is slightly wider at the top than the bottom. This is because the gun forearm is normally wider than the gun stock in long guns.

Figure 4:
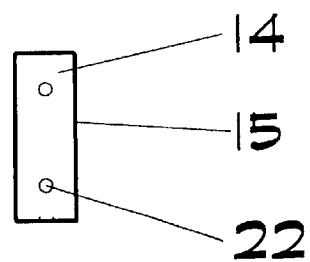
FIG. 4 is a plan view of an end of a scabbard according to FIG. 1.

It is a unique feature of the present invention that it can be mounted vertically, horizontally or diagonally. The scabbard could be mounted vertically as shown in FIG. 3, for example, behind a passenger seat in the passenger compartment of a car or truck, or in the bed of a truck. With vertical mounting, the device does not occupy much floor space. Also, several units can be mounted side by side, and the gun barrels are in a safe position (pointed upward). Referring to FIG. 4, attachment holes or brackets, or drainage holes 22 for draining water from inside the gun scabbard, may be furnished at the closed bottom end 14 of the device rather than on the back 20 if the device will only be mounted in a vertical position. Alternatively, where upright (vertical) mounting is impractical, as it would be on an ATV, the scabbard 10 can be mounted horizontally or diagonally. The scabbard can be attached to the front or side of an ATV, for example. The device is also versatile in that it can easily be detached, e.g., by unscrewing screws or pulling bolts, from one vehicle, such as a truck driven to a hunting lodge, and attached to another vehicle, such as an ATV kept at the lodge, in any position desired by the user. The scabbards of the present invention can be mounted on four wheelers, tractors, carts, jeeps, boats, and deer stands, for example.

Another benefit of the device is that in cold weather the preferred aluminum shell and padded liner hold heat generated by the moving vehicle. This keeps the gun inside relatively warm, so that the user's fingers are not incapacitated by cold metal when they first contact the gun metal. This varies according to where the scabbard is located in or on the vehicle.

The locking lid mechanism 17 preferably attaches across the open front of the device 10. The lid is preferably hinged and has an open position adapted for inserting a long gun, and a closed position adapted for preventing removal of the long gun from the device without a key. The attachment mechanism preferably comprises a permanent magnet adapted for removably attaching the device 10 to a ferromagnetic surface.

Figure 5:
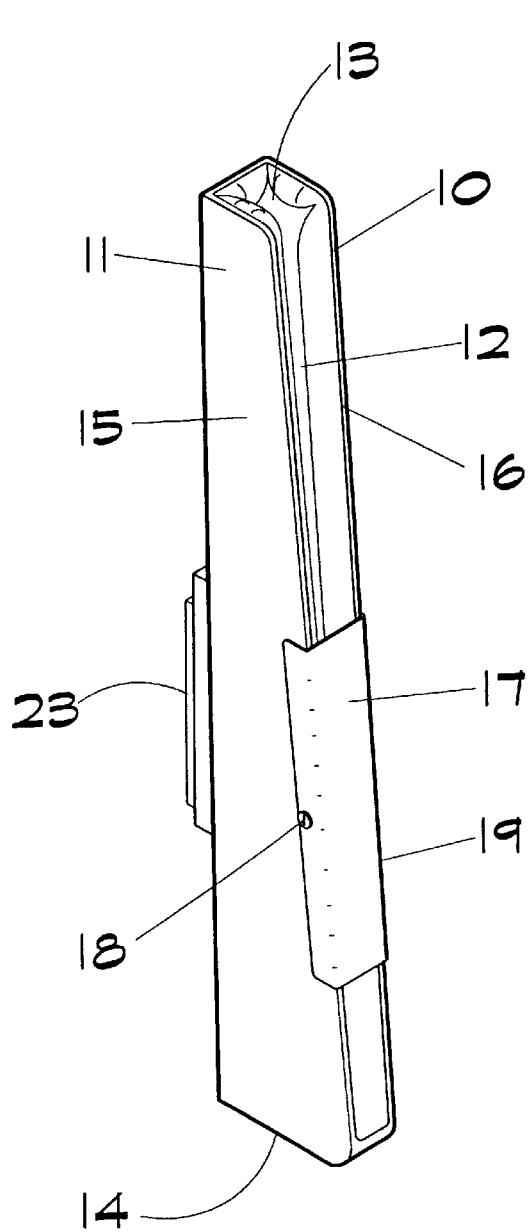
FIG. 5 shows a perspective view of a gun scabbard according to the present invention, with a magnetic attachment.

As shown in FIG. 5, the scabbard 10 can be removably affixed to any convenient metal surface with a magnetic attachment mechanism 23. This alternate attachment mechanism can be used in place of bolts or brackets. The magnetic attachment mechanism 23 includes a permanent magnet, and is preferably attached to the back 20 and/or bottom end 14 of the scabbard. The magnetic attachment mechanism 23 may include an optional cap over the permanent magnet. The magnet is exposed when the cap is removed. The magnet is placed onto the ferromagnetic surface the user has selected. The magnet and attached scabbard remain there due to magnetic attraction until the user pulls the scabbard off the surface and reattaches it elsewhere. Magnet size is selected with the weight of the gun and scabbard, and likely ferromagnetic surfaces, in mind. This magnetic attachment mechanism could be included on any scabbard within the scope of this invention.

Figure 6:
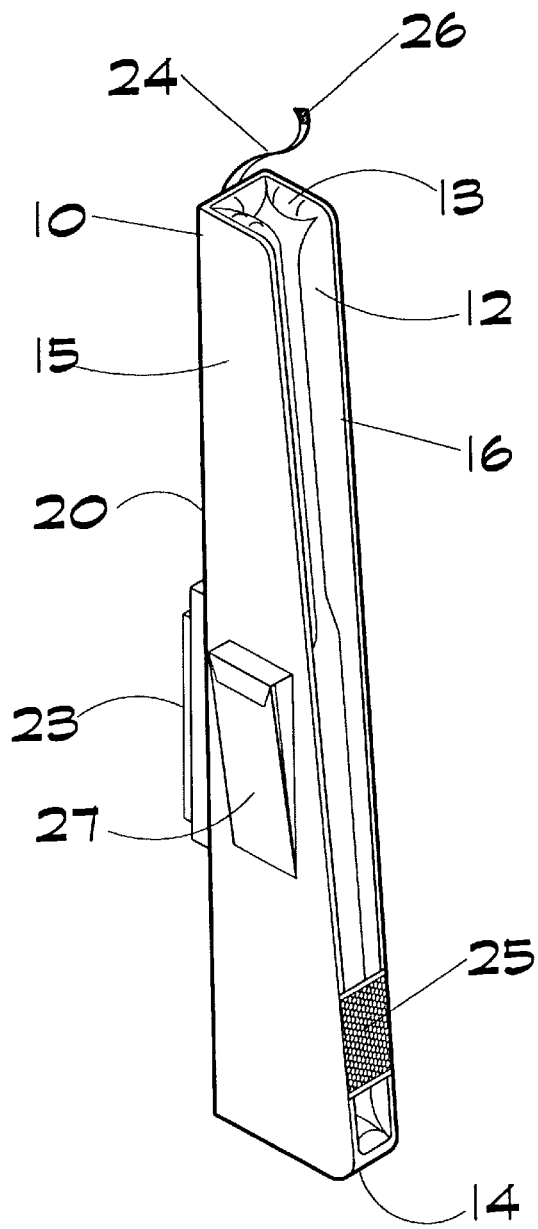
FIG. 6 shows a perspective view of an alternate embodiment of a gun scabbard according to the present invention, with a strap to secure a long gun.

Referring to FIG. 6, an alternate embodiment of the scabbard 10 has a detachable strap 24 at the top end 13, and a barrier 25 across the front of the scabbard towards the bottom end. One end of the strap 24 is sewn on the scabbard, and an opposite end of the strap has a lock and loop strip member 26 sewn on. An opposing hook and loop fastener member (a loop-pile strip and a mating strip with hook-shaped fibers) is adhered to the outside top back of the scabbard. Once a gun has been placed in the scabbard, the strap 24, which is preferably made of a durable nylon material, is looped around the gun barrel and attached by the hook and loop strip members. This barrel strap 24 holds the gun barrel in place, and is easy to attach and detach. Once a gun is in place in the scabbard, it is difficult to remove the gun without detaching the strap 24. When a gun is in place in the scabbard, the barrier 25 extends across the gun butt (or gun stock) and helps to hold the gun in the scabbard. The barrier is preferably made of a soft, flexible material. The strap 24 and barrier 25 are most preferably made of a nylon webbing material so the gun finish is not damaged.

One or more pockets 27, or other devices such as reflective tape or a rain cover, may be attached to the device for storing small items of equipment such as game calls.

The pocket 27 shown in FIG. 6 is attached to a side 11 of the scabbard and has a top flap with a closure.

Figure 7:
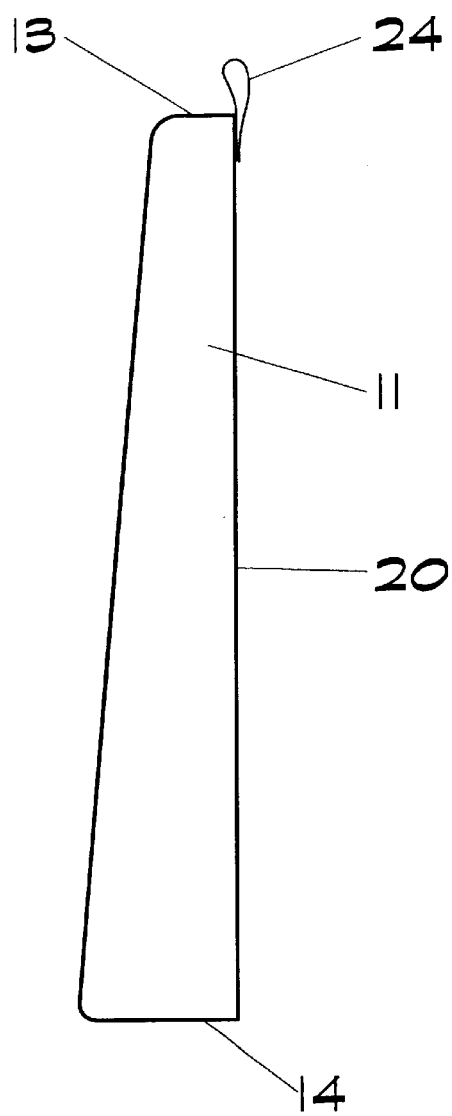
FIG. 7 is an elevation view of one side of a scabbard according to FIG. 6.

As shown in FIG. 7, a side 11 opposite to the side shown in FIG. 6 also has a sloping front edge (at 12) and is wider at the bottom end 14 than at the top end 13 of the device 10. The gun barrel strap 24 is shown detached in FIG. 6 and fastened in FIG. 7.

Figure 8:
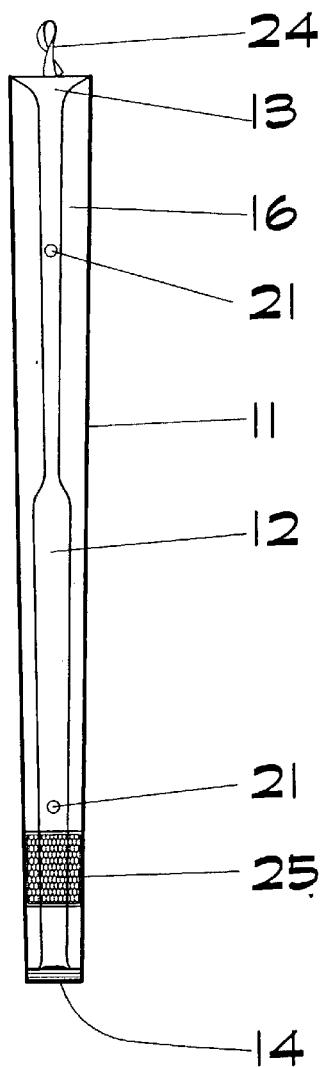
FIG. 8 is an elevation view of the front of a scabbard according to FIG. 6.

In FIG. 8, the open front 12 of the device is shown. The barrier 25 is just above the bottom end 14. The padded liner 16 is roughly in the shape of a long gun. There are two spaced-apart, attachment holes 21 at the back of the scabbard.

Figure 9:
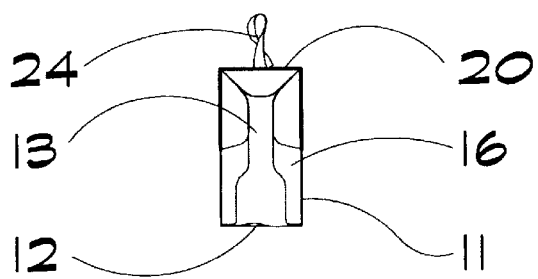
FIG. 9 is a plan view of an end of a scabbard according to FIG. 6.

As shown in FIG. 9, the top end 13 of the scabbard is open at the front 12, and closed at the back 20. This top end 13, which has a liner 16, supports the gun barrel. The barrel strap 24 is shown in a closed position.

Figure 11:
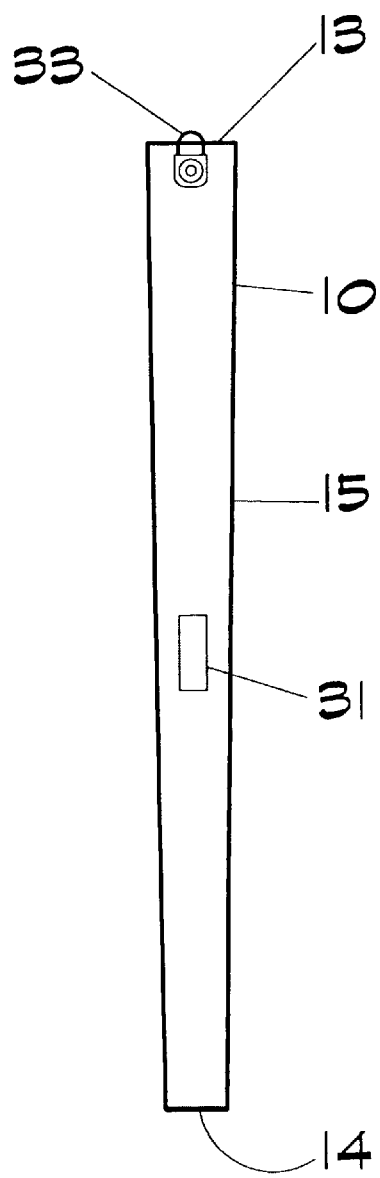
FIG. 11 is an elevation view of the back of a scabbard according to FIG. 10.
Figure 10:
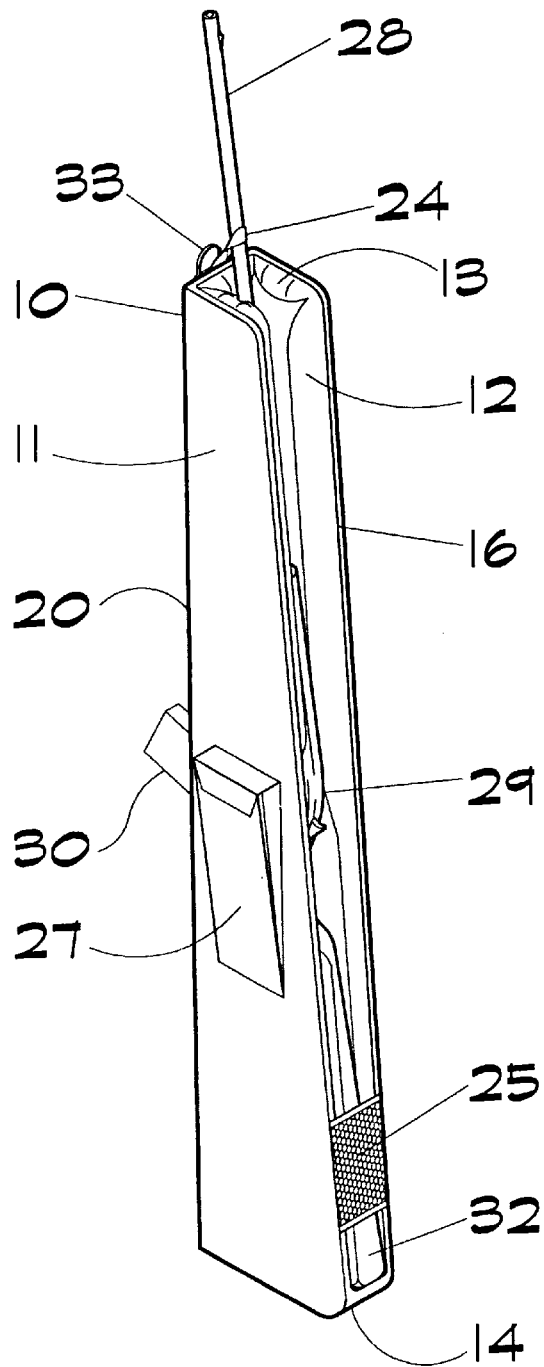
FIG. 10 is a perspective view of a scabbard according to the present invention, holding a long gun.

Referring to FIGS. 10 and 11, a third embodiment of the present device 10 is for long guns with clips (or magazines). The scabbard 10 holds a long gun, with the detachable strap 24 shown attached around a gun barrel 28. As seen through the open front 12 of the scabbard, the gun action 29, including the trigger and firing pin, is cushioned by the padded lining 16. As shown in FIG. 11, the gun clip 30 extends through a rectangular-shaped clip slot 31 in the approximate middle of the back 20 of the scabbard. At the bottom of the device, the gun butt 32 lies against the barrier 25 as shown in FIG. 10. When a long gun is mounted in the device, the gun butt 32 rests on the bottom end 14 of the device. As can be seen in FIG. 11, the top end (at 13) of the back 20 is wider than the bottom end (at 14) of the back.

As seen in FIGS. 10 and 11, the scabbard 10 preferably further comprises a locking mechanism, most preferably a padlock 33, attached to the top of the scabbard. As an alternative to the embodiment with the locking hinged lid, the present invention has an embodiment with a detachable strap 24, and a barrier 25 across the front of the scabbard, as shown in FIG. 10. The strap 24 is adapted for closely fitting around the barrel 28 of a gun in the scabbard, and the barrier 25 is adapted for containing the gun butt 32. The strap 24 is preferably formed of nylon or elastic, and it may have one end affixed to the top of the scabbard and an opposite, loose end for removable attachment to the scabbard. Where the scabbard 10 has a strap, the locking mechanism is most preferably a steel padlock 33 that attaches the loose end of the strap to the scabbard. The padlock 33 could be fastened through a grommet in the strap once the strap is closely fastened around the gun barrel. The padlock can be opened by a user with the key to the lock. The scabbard 10 may instead comprise a shackle padlock affixed to the back top of the scabbard. The shackle padlock can be fastened around the gun barrel 28 where the barrel projects from the open top of the scabbard. With the barrier 25 holding the gun butt 32 at the bottom of the scabbard, and the shackle padlock locked around the gun barrel 28 at the top of the scabbard, it is quite difficult to remove the gun. These locking mechanisms offer some protection from persons attempting to tamper with the gun in the scabbard.

Thus, a preferred device under the present invention comprises:
- a one-piece, aluminum cover member comprising an enclosed bottom end, an open top end, an open front, and two generally parallel sides separated by a back, the back being generally perpendicular to the sides;
- a water-resistant, padded, protective lining attached to the aluminum cover member;
- an attachment mechanism on the bottom end or back of the device adapted for removably attaching the device to a surface; and
- a locking lid mechanism which attaches across the open front of the device, the lid mechanism having an open position adapted for inserting the long gun, and a closed position adapted for preventing removal of the long gun from the device when the locking mechanism is locked.

Also included herein is a method for making a protective scabbard for long guns. The method comprises the steps of:
1) Cutting, bending, or forming a generally rectangular section of rigid material to form a rectangular-shaped scabbard with an open front and an open top end. The scabbard has elongate sides and back, and a closed bottom end opposite the open top end. The scabbard is adapted to support a long gun. The rigid material is preferably metal or plastic. Most preferably, the rigid material is aluminum, and one piece of aluminum is bent to form the generally rectangular shaped scabbard.
2) Removably attaching to an inside portion of the scabbard a water-resistant, protective, padded liner. The liner is most preferably fabric and attached onto the scabbard by hook and loop strip members.
3) Attaching a locking mechanism on the outside of the scabbard. This step preferably comprises the substeps of: attaching a hinged lid having a locking member to an edge of the open front of the scabbard; and attaching an opposite locking member to an opposite edge of the open front of the scabbard.
4) Fixing to the scabbard an attachment mechanism adapted for detachably attaching the scabbard to a surface. The attachment mechanism preferably allows removable attachment of the device to the surface in a vertical, horizontal or diagonal position. The attachment mechanism is most preferably a magnetic attachment mechanism adapted for removably fixing the device on a ferromagnetic surface.

The method preferably further comprises the step of:
5) Attaching a detachable strap to the open top end of the scabbard, the strap being adapted for closely fitting around a gun barrel; and attaching a barrier across the front of the scabbard, the barrier being adapted for containing a gun butt. This is an alternative to the hinged lid described above. The strap is preferably formed of nylon or elastic, and the strap may have one end affixed to the scabbard and an opposite, loose end for removable attachment to the scabbard. Where the device has a strap, the locking mechanism is most preferably a steel padlock that attaches the loose end of the strap to the scabbard. The padlock could be fastened through a grommet in the strap once the strap is closely fastened around the gun barrel. The device may instead comprise a shackle padlock affixed to the back top of the scabbard. The shackle padlock can be fastened around the gun barrel where the barrel projects from the open top of the scabbard. With the barrier holding the gun butt at the bottom of the scabbard, and the shackle padlock locked around the gun barrel at the top of the scabbard, it is quite difficult to remove the gun. These locking mechanisms offer some protection from persons attempting to tamper with the gun in the scabbard.

The method also preferably further comprises the step of:
6) Perforating the closed bottom end of the scabbard to form one or more drainage holes. This is preferred where the scabbard may be mounted in a vertical position outside the vehicle, where the scabbard may be exposed to rain, etc.

From the foregoing it can be realized that the described device of the present invention may be easily and conveniently utilized as a carrier for a long gun. This device is inexpensive, durable, dependable, and effective in accomplishing its intended purposes. No clamping members are required which could work their way loose and cause the gun to dislodge.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the nature of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS (For Information Only)
10 device
11 sides of the device
12 open front of the device
13 open top end of the device
14 bottom end of the device
15 rigid cover member
16 liner
17 lid mechanism
18 lock on lid mechanism
19 lid hinge
20 back of the device
21 attachment holes
22 drainage holes
23 magnetic attachment mechanism
24 gun barrel strap
25 barrier
26 hook and loop strip member
27 pocket
28 gun barrel
29 gun action
30 gun clip
31 clip slot in back
32 gun butt
33 padlock

What is claimed is:
1. A device for mounting a long gun, comprising:
   a one-piece, rigid cover member, formed into a rectangular-shaped box suitable for holding a long gun, the box comprising an enclosed bottom end, an open top end, and two generally parallel sides separated by a back, the back being generally perpendicular to the sides;

a protective liner attached to an inside of the rigid cover member;

an attachment mechanism for attaching the device to a surface; and a detachable strap attached to a top open end of the device, the strap being adapted for closely holding a gun barrel, and a barrier across an open front of the device, the barrier being adapted for holding a gun butt in the device.

2. A device according to claim 1, wherein the cover member is aluminum, and the liner is made of fabric and padding.

3. A device according to claim 2, wherein the attachment mechanism is a magnetic attachment mechanism on the back or bottom end of the device adapted for removably attaching the device to a ferromagnetic surface on a vehicle.

4. A device according to claim 2, wherein the detachable strap has one end affixed to the top back of the device and an opposite, loose end for removable attachment to the device.

5. A device according to claim 4, further comprising a padlock attachable to the loose end of the strap, the padlock being adapted for locking the detachable strap closely around the barrel of a long gun in the device.

6. A device according to claim 1, wherein the liner is detachably attached to the aluminum cover member by hook and loop strip members, and the two sides of the device are wider at the bottom than at the top.

7. A device according to claim 1, comprising attachment mechanisms on the back and the bottom end of the device for removably attaching the device to a vehicle in a vertical, horizontal or diagonal position.

8. A device according to claim 6, wherein the attachment mechanism is a magnetic attachment mechanism adapted for removably attaching the device to a ferromagnetic surface.

9. A device for supporting a long gun, the device comprising:

a one-piece, aluminum cover member comprising an enclosed bottom end, an open top end, an open front, and two generally parallel sides separated by a back, the back being generally perpendicular to the sides;

a water-resistant, padded, protective lining attached to the aluminum cover member;

an attachment mechanism on the bottom end or back of the device adapted for removably attaching the device to a surface; and a locking lid mechanism which attaches across the open front of the device, the lid mechanism having an open position adapted for inserting the long gun, and a closed position adapted for preventing removal of the long gun from the device when the locking mechanism is locked.

10. A device according to claim 9, wherein the attachment mechanism comprises a permanent magnet adapted for removably attaching the device to a ferromagnetic surface.

11. A method for making a protective scabbard for holding long guns, the method comprising the steps of:

cutting, bending, or forming a generally rectangular section of rigid cover material to form a rectangular-shaped scabbard with an open front and an open top end, the scabbard having elongate sides and back, and a closed bottom end opposite the open top end, the scabbard being adapted to support a long gun;

removably attaching to an inside portion of the scabbard a water-resistant, protective, padded liner;

attaching a locking mechanism on the outside of the scabbard; and fixing to the scabbard an attachment mechanism adapted for detachably attaching the scabbard to a surface.

12. A method according to claim 11, wherein the rigid material is metal or plastic.

13. A method according to claim 12, wherein the attachment mechanism allows removable attachment of the device to a vehicle in a vertical, horizontal or diagonal position.

14. A method according to claim 11, wherein the rigid material is aluminum, and one piece of aluminum is bent to form the generally rectangular-shaped scabbard.

15. A method according to claim 14, wherein the attachment mechanism is a magnetic attachment mechanism adapted for removably fixing the device on a ferromagnetic surface on or in a vehicle.

16. A method according to claim 15, wherein the liner is fabric and is detachably attached to the cover member by hook and loop strip members.

17. A method according to claim 15, wherein attaching a locking member comprises the substeps of: attaching a hinged lid having a locking member to an edge of the open front of the scabbard; and attaching an opposite locking member to an opposite edge of the open front of the scabbard.

18. A method according to claim 16, further comprising the step of: attaching a detachable strap to the open top end of the scabbard, the strap being adapted for closely fitting around a gun barrel; and attaching a barrier across the front of the scabbard, the barrier being adapted for containing a gun butt.

19. A method according to claim 18, wherein the strap is formed of nylon or elastic, and has one end affixed to the scabbard and an opposite, loose end for removable attachment to the scabbard, the scabbard further comprising a padlock adapted for locking the loose end of the strap to the scabbard.

20. A method according to claim 19, further comprising the step of: perforating the closed bottom end of the scabbard to form one or more drainage holes.

* * * * *